April 27, 1937.   J. A. McGREW   2,078,262
LOCOMOTIVE
Filed May 16, 1935    10 Sheets-Sheet 4
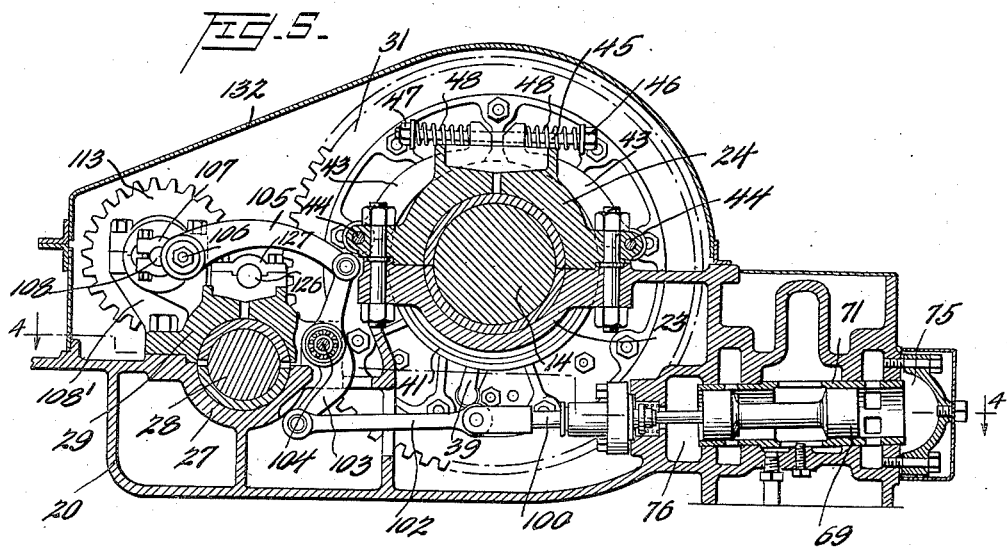
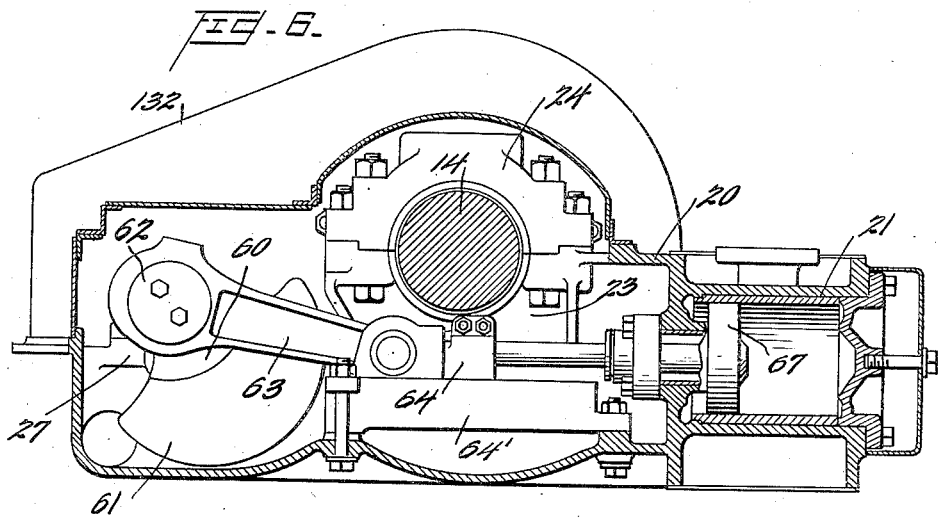
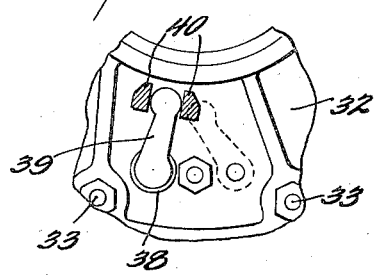
Inventor
John A. McGrew
By Watson, Coit, Morse & Grindle   Attorney April 27, 1937.　　J. A. McGREW　　2,078,262
LOCOMOTIVE
Filed May 16, 1935　　10 Sheets-Sheet 5
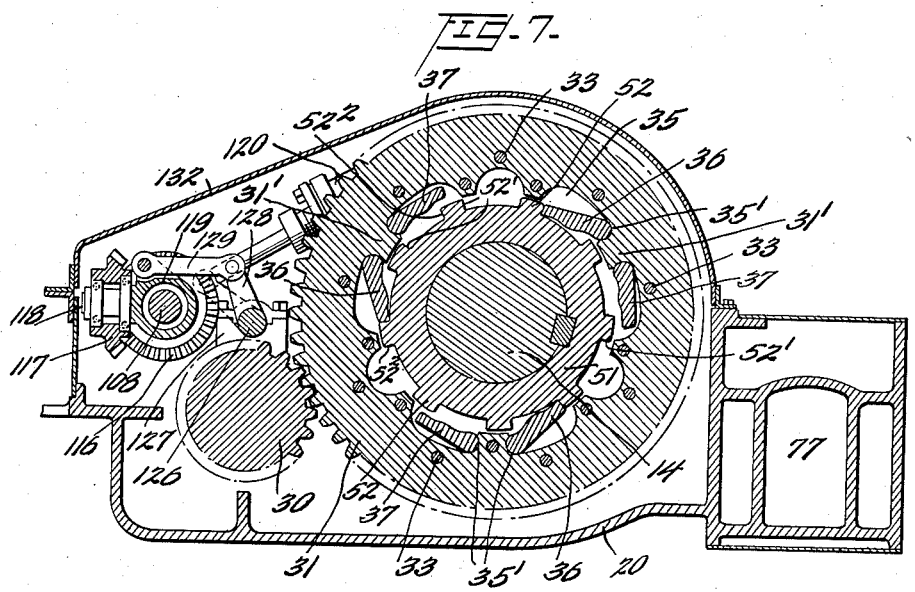
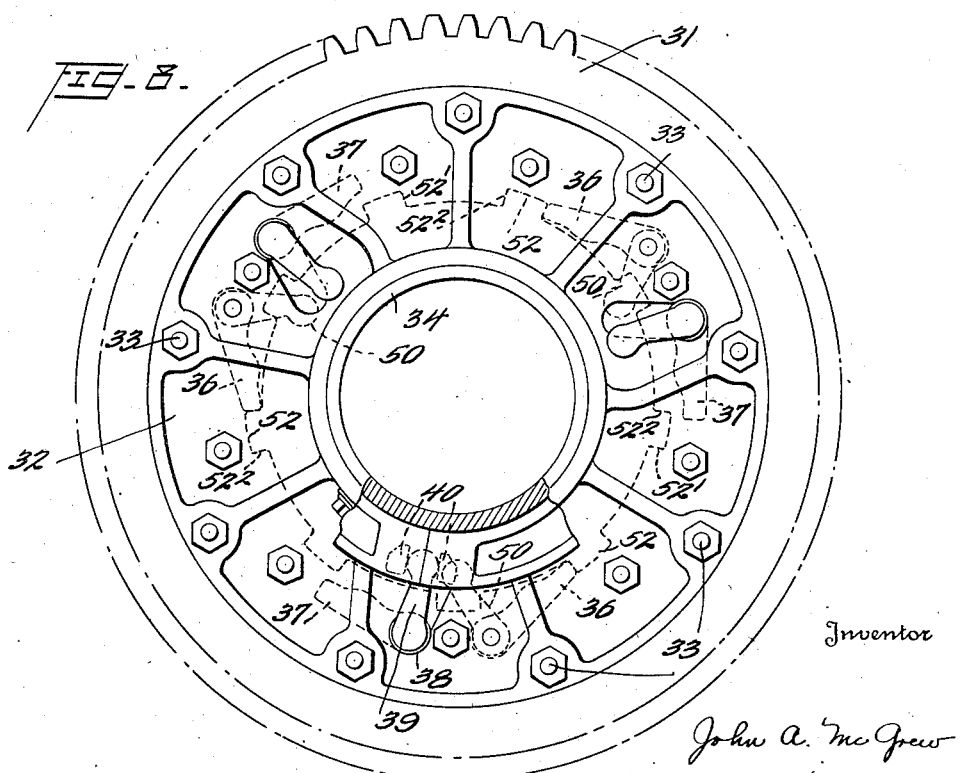
Inventor
John A. McGrew
Watson, Coit, Morse
& Grindle Attorneys April 27, 1937. J. A. McGREW 2,078,262
LOCOMOTIVE
Filed May 16, 1935 10 Sheets-Sheet 6
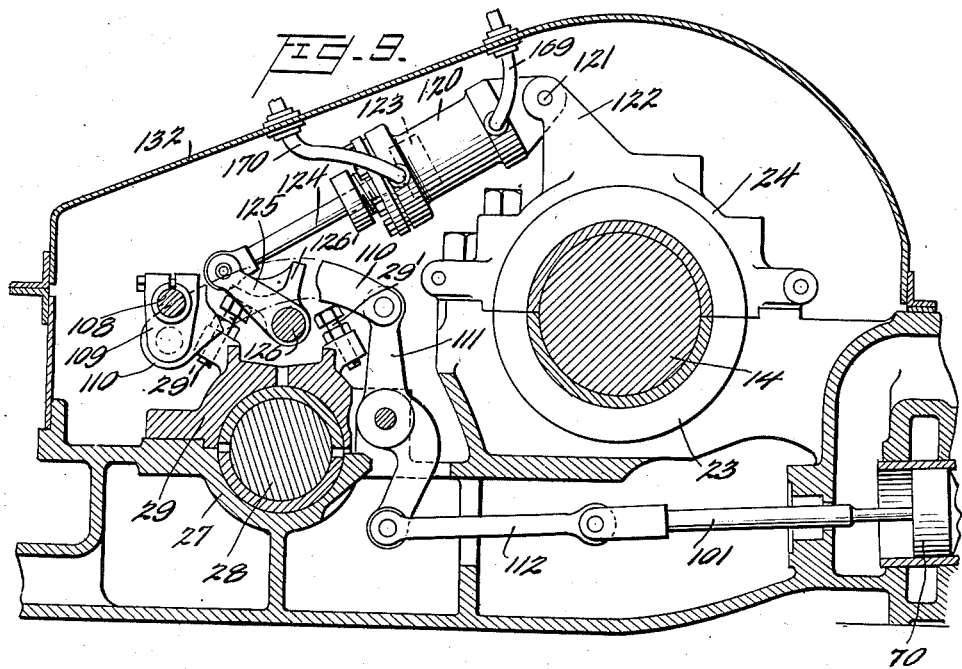
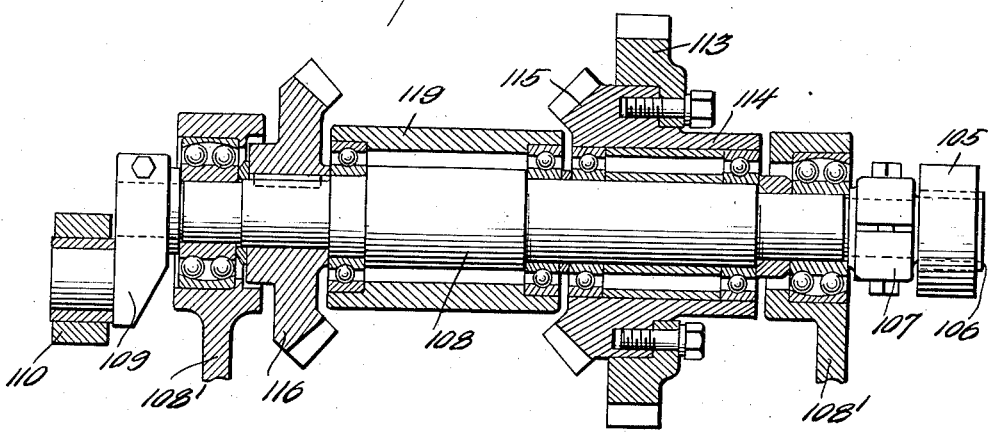
Inventor
John A. McGrew
By Watson, Coit, Morse
& Grindle
Attorney

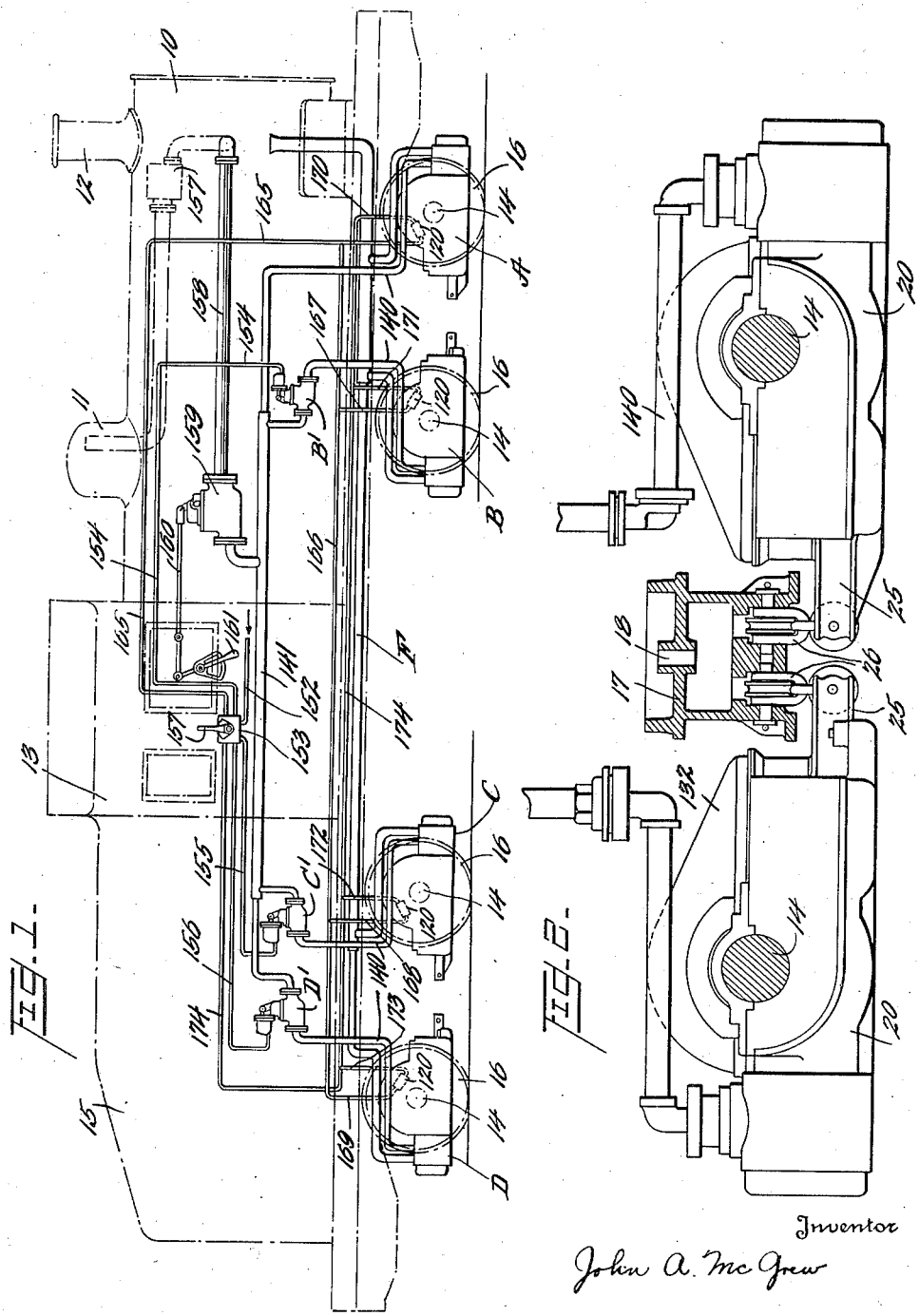

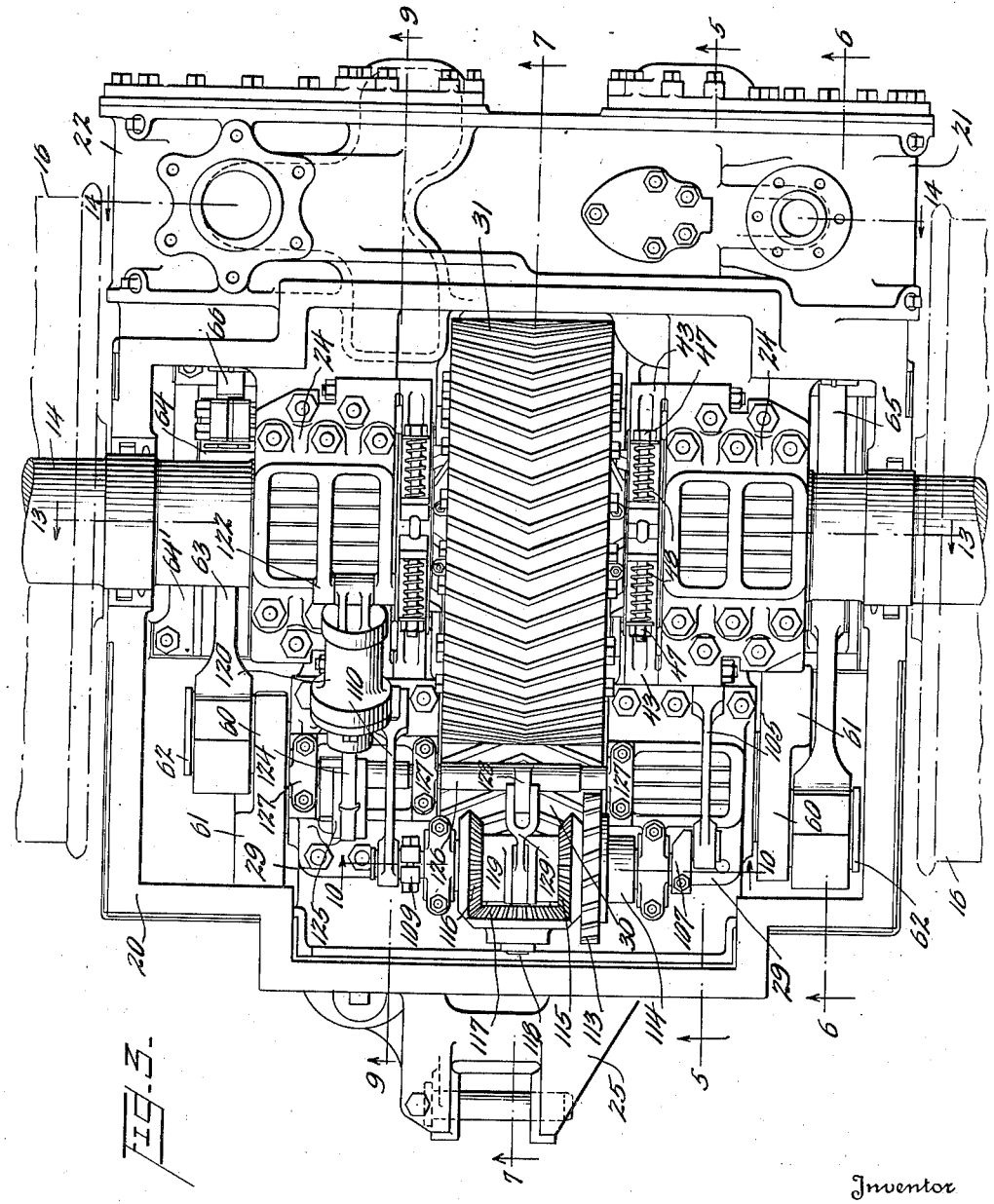

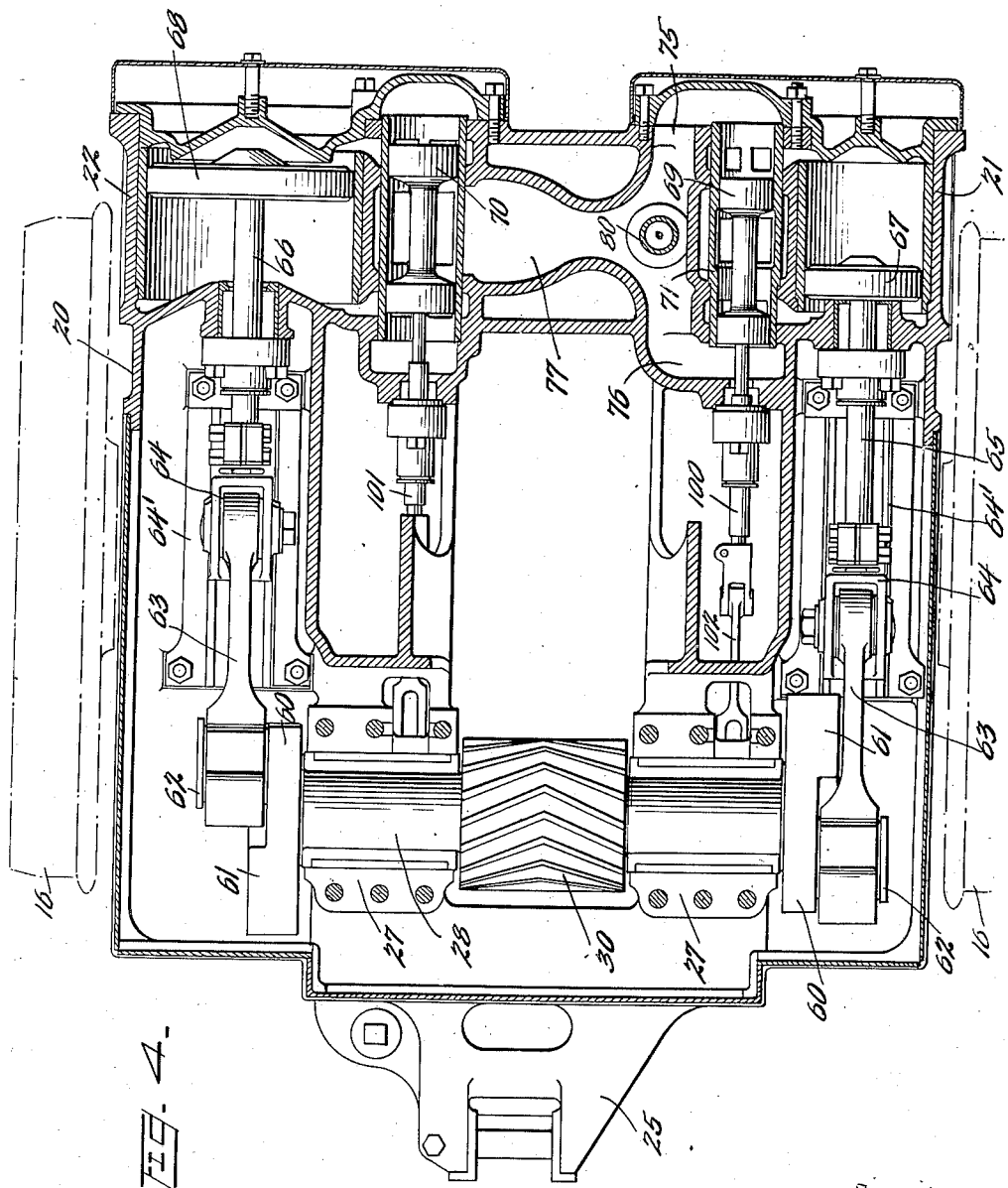

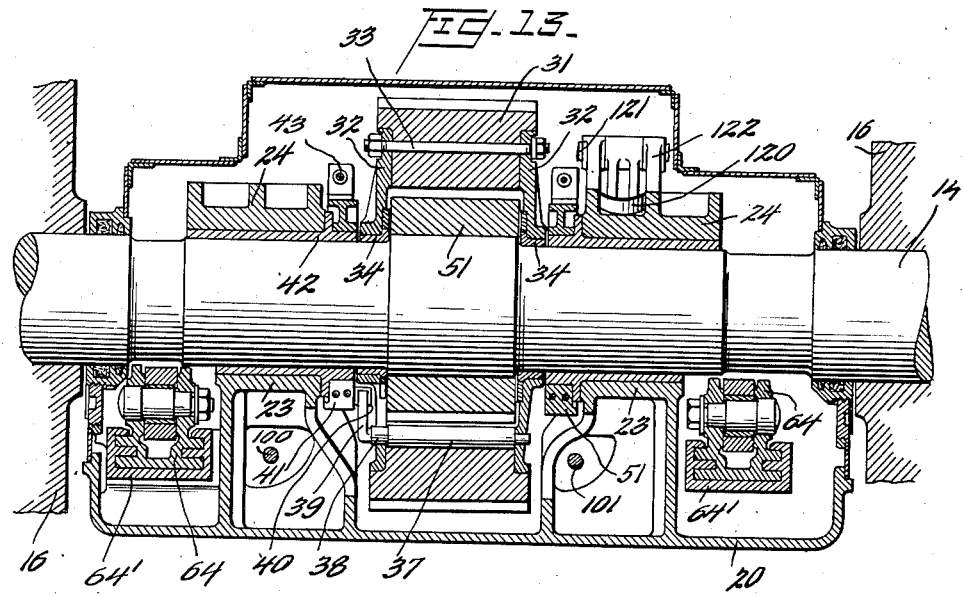
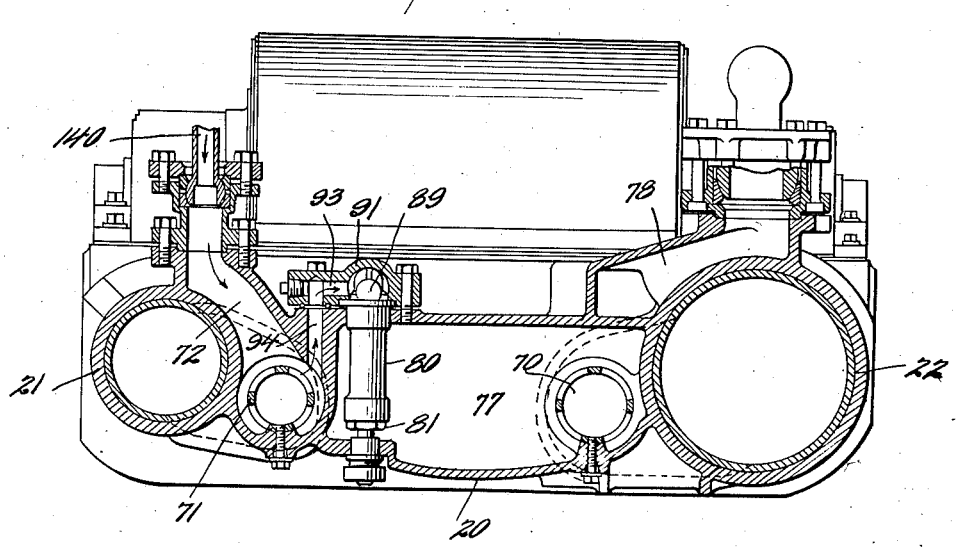

April 27, 1937.  J. A. McGREW  2,078,262
LOCOMOTIVE
Filed May 16, 1935  10 Sheets-Sheet 8

Inventor
John A. McGrew
Watson, Cok, Morse
& Windle  Attorney

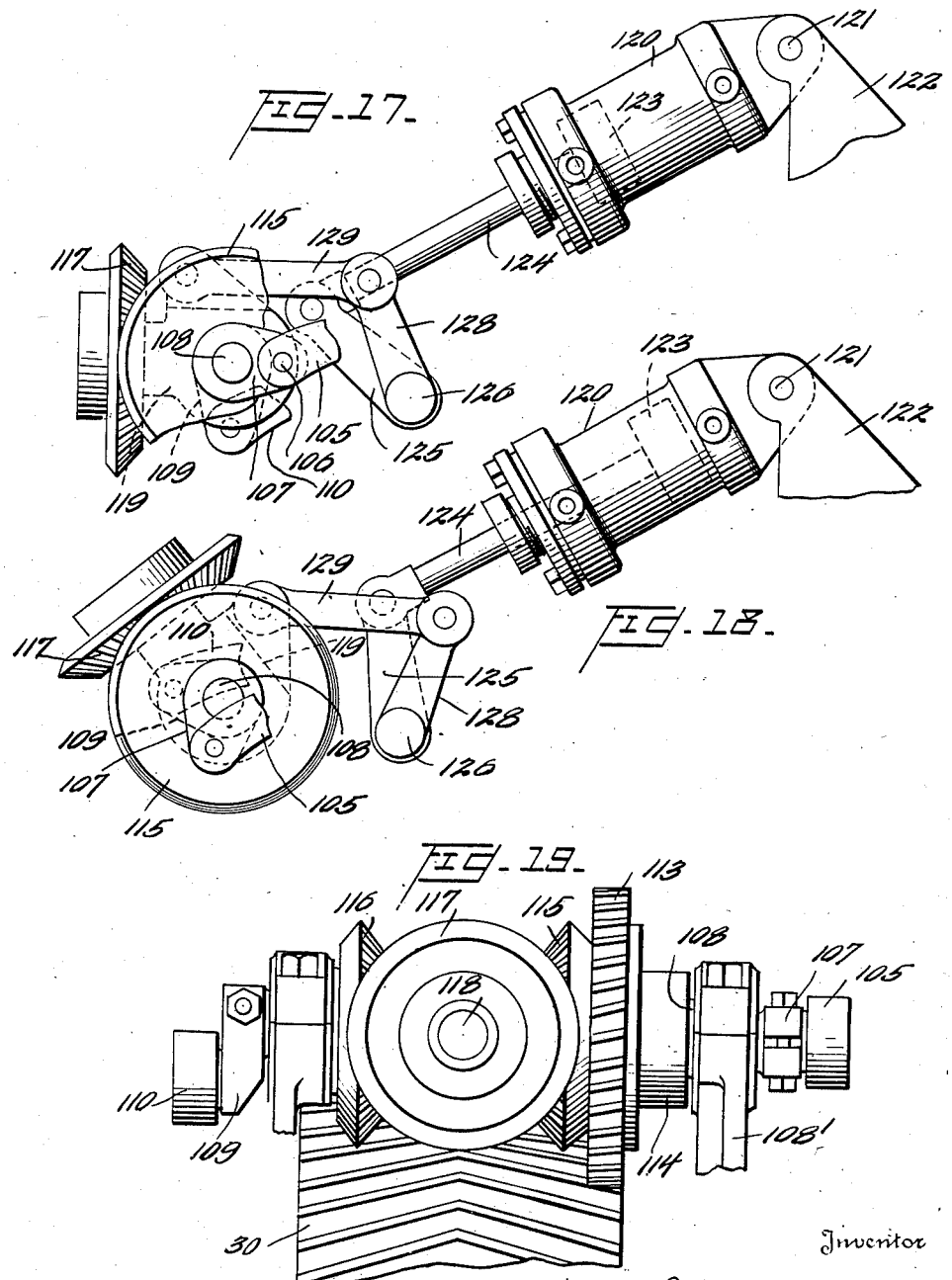

April 27, 1937.  J. A. McGREW  2,078,262
LOCOMOTIVE
Filed May 16, 1935   10 Sheets-Sheet 10
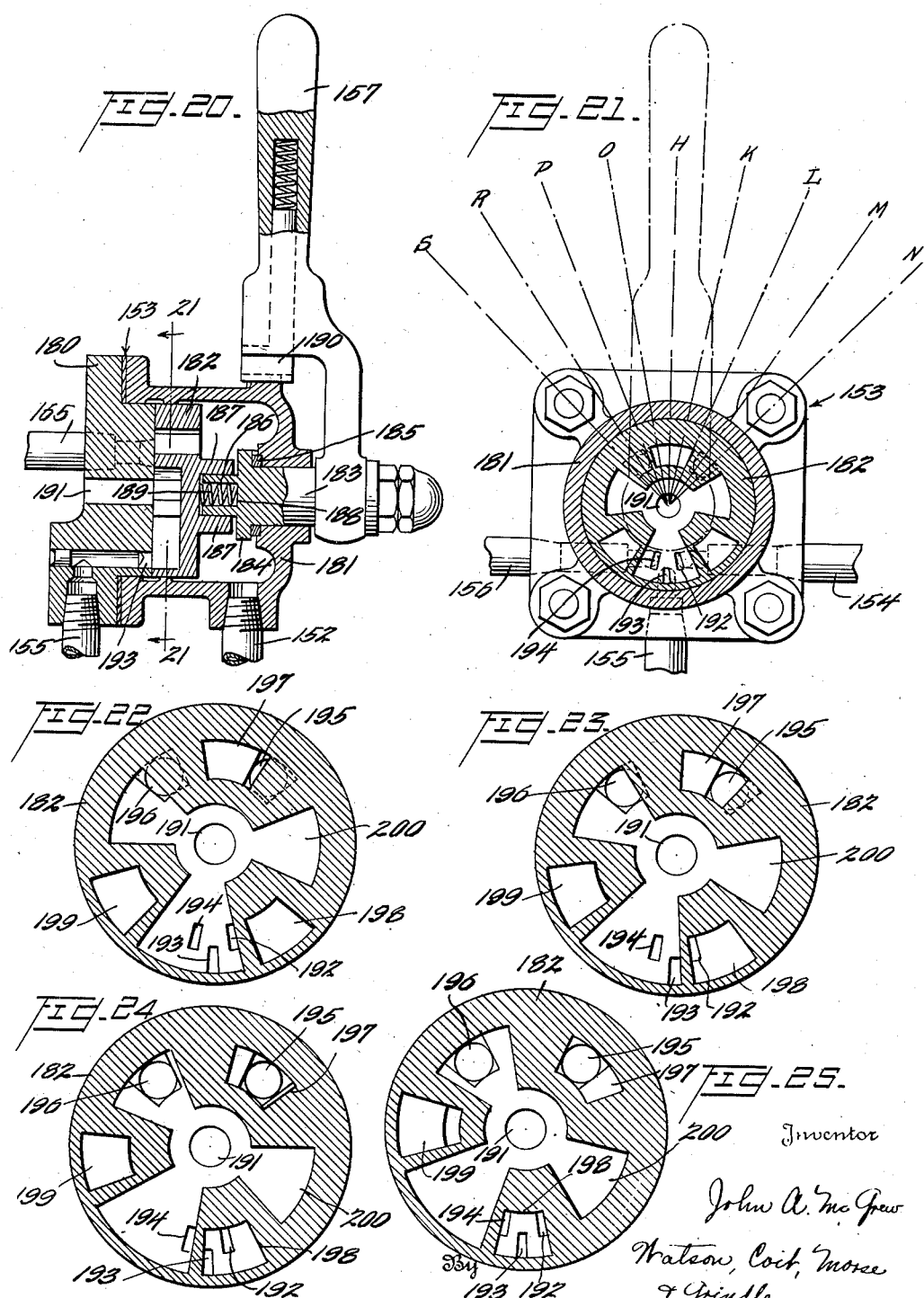

Patented Apr. 27, 1937

2,078,262

UNITED STATES PATENT OFFICE 2,078,262

LOCOMOTIVE

John A. McGrew, Albany, N. Y.

Application May 16, 1935, Serial No. 21,855

6 Claims. (Cl. 105—37)

The present invention relates to steam locomotives and its general purpose is to provide a locomotive of improved type, adapted for use under all operating conditions but particularly where the operating conditions are generally adverse to the economical utilization of steam propelled locomotives, as in mountainous or hilly districts, in sections where track curvatures are frequent and of short radius, and in freight yards and around terminals where frequent starting and stopping is necessary and the loads vary greatly.

A primary object of the invention is to provide a locomotive which will operate at the lowest possible cost from the standpoint of steam consumption; in other words, a locomotive in which the consumption is minimized for all of its possible operating speeds, regardless of whether the load being pulled is heavy or light, and regardless of the gradient of the tracks over which the locomotive passes. Another feature of the improved locomotive resides in its ability to operate in a superior manner insofar as the actual operations of the driving engines are concerned, a locomotive constructed in accordance with the teachings of the present invention maintaining at all times and under all conditions equal working pressures in its several operating cylinders, a desirable condition not realized with compound locomotives heretofore designed or placed in use.

The improved locomotive is also so designed and constructed that the wear of its operating parts is minimized, thus promoting longer life and reducing greatly the expense and delay incident to overhauling and repair. Finally, a locomotive constructed in accordance with the present invention has greater adaptability for use in mountainous or hilly districts, or around terminals, where many curves of short radius are met with, having the capacity to freely pass around a curve of relatively short radius, and despite the fact that its overall length may be substantially the same as locomotives of other types but having the same boiler capacity. The invention contemplates a locomotive of the type in which the generated steam is conveyed to a plurality of independently operable engines, by means of which the tractive effort is developed. The number of engines or motors may be varied as desired but in all cases the locomotive includes control means whereby its operator is enabled to selectively energize or de-energize the engines in order that the quantity of steam consumed is only sufficient to propel the locomotive at the desired speed. When starting under heavy loads or when ascending grades heavily loaded all of the motors or engines may be energized and the maximum capacity of the boiler utilized. When proceeding under relatively light loads a lesser number of engines may be used, in this way economy of steam consumption being promoted. Furthermore, consumption of steam is further reduced, as compared with ordinary practice, by eliminating from the several motors the commonly used and well-known mechanisms for varying the engine "cut-off" and hence regulating the quantity of steam flowing to the engine cylinders. It is now universal practice in locomotive construction to provide linkage or other mechanism by means of which the engineer may vary the positions of the steam valves to make more or less use of the expansive properties of the steam in the propulsion of the pistons.

In accordance with my invention, however, such mechanisms are dispensed with and the valves are at all times disposed in such positions that the steam is fully expanded and hence is used in the most efficient manner. In lieu of the utilization of the common "cut-off mechanism" I vary, to bring about variations in tractive effort, the number of engines or motors in operation, increasing the number when more power is needed and decreasing the number when less power is needed. Without sacrifice of flexibility in the development of tractive effort, therefore, I provide a locomotive so designed and constructed as to make use of the steam in the most economical manner, thus making it possible to operate the same over longer distances for a given fuel consumption than heretofore and considerably reducing the net cost of operation per mile under given conditions as compared with previous types of locomotives.

Increased economy in steam consumption is also brought about by providing each of the several engines or motors used with a disconnectible driving connection to the wheels which it is designed and intended to propel. The engineman may at will connect one or more of the motors to the associated driving wheels or may disconnect all of the motors from the driving wheels, as will be desirable when the locomotive is drifting downgrade. As will be appreciated to one skilled in the art this will effect very substantial savings in steam consumption since with locomotives such as now commonly used and in which there is a permanent connection between each engine and its associated driving wheels, much steam must be supplied even when going downgrade for the purpose of lubricating the cylinders and valves and balancing disturbing forces set up by the heavy reciprocating parts. Particularly in drifting down long grades such as are frequently met with in hilly or mountainous sections are large volumes of steam necessarily wasted in this manner, with locomotives of the type now commonly used.

Smoother operation of the driving engines of the improved locomotive is realized by reason of the elimination of the variable "cut-off" mechanism. Where such "cut-offs" are used, it is hardly possible to obtain the refinement in steam distribution necessary to obtain equal pressures in all working cylinders, for various degrees of "cut-off". As the present locomotive embodies no variable "cut-offs" the steam pressures in the several cylinders are much more nearly the same and a better balance in operation is thereby obtained.

Increased life of the operating parts of the locomotive is promoted by reason of the fact that all operating parts not actually employed in driving are disconnected from their associated driving wheels, which wheels rotate idly when the locomotive is in motion and do not actuate these parts. Thus when one of the motors is de-energized because not needed for the propulsion of the locomotive it is automatically disconnected from its associated driving wheel and the pistols, valves, and other operating parts thereof, remain at rest. Naturally the wear and tear on the operating parts is reduced to a minimum with such construction and method of operation and length of the life of the locomotive, considered as a whole, appreciably increased.

Greater flexibility in operation around curves results from the fact that in a locomotive constructed in accordance with the present invention the several operating engines, which are individually comparatively small, are mounted upon swivel trucks, spaced apart, the driving wheels being of relatively small diameter and permitting the trucks to swing horizontally about their pivotal axes through relatively wide angles with respect to the axis of the locomotive. Naturally, a locomotive so designed and constructed may move much more readily around a curve of short radius than a locomotive of the same power constructed in the manner now most commonly employed and embodying a plurality of relatively large driving wheels permanently connected to pistons working in cylinders located in advance of the driving wheels.

In addition to the general advantages above set forth the invention embodies a considerable number of novel features of construction which, taken together, render it more flexible, economical, and generally satisfactory in use than other types of locomotives heretofore designed. All of these novel features will be hereinafter described in detail and the advantages thereof pointed out. Certain of the improvements are applicable only to a locomotive of the general type contemplated by the present invention, while others may be used in connection with locomotives of other types. As will be apparent to one skilled in the art also, various features of the improved locomotive may be considerably modified in design and arrangement without departing from the spirit and scope of the invention.

In the accompanying drawings, one embodiment of the invention is disclosed generally and in detail:

Figure 1 is a rather diagrammatic representation of the improved locomotive, the locomotive boiler and cab being shown in chain lines and the principal features of the operating mechanism being shown in full and dotted lines. Portions of the motor supporting trucks are omitted for the purpose of simplification;

Figure 2 illustrates in side elevation two of the four motors employed with the locomotive shown diagrammatically in Figure 1, these motors being mounted upon a single truck, portion only of which is shown (in section) in order that the manner of support of the motors may be understood;

Figure 3 is a top plan view of one of the motors with cover plate removed in order that the operating parts may be seen;

Figure 15:
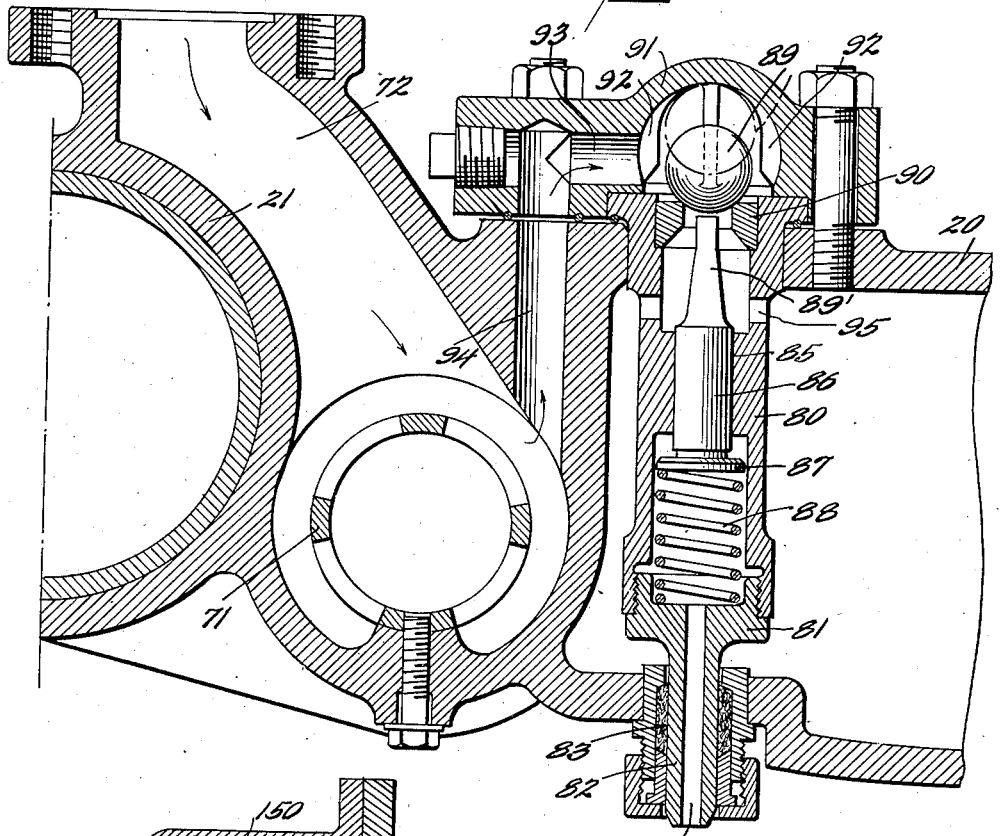
Figure 16:
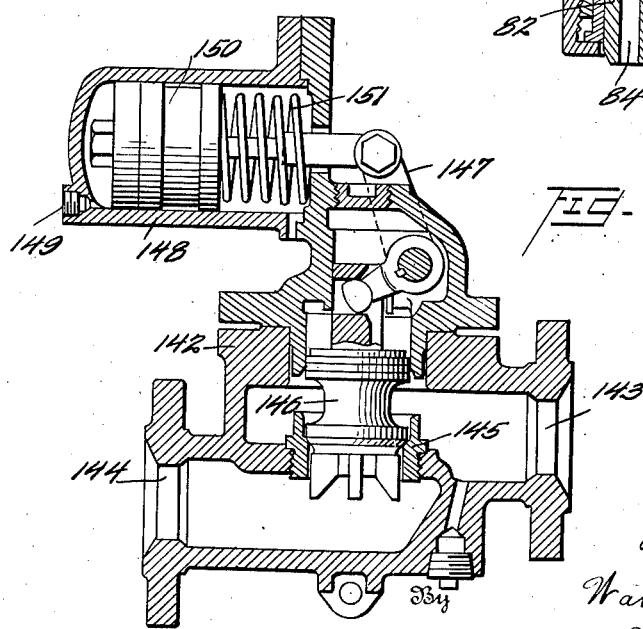

Figure 4 is a section on line 4—4 of Figure 5;
Figure 5 is a section on line 5—5 of Figure 3;
Figure 6 is a section on line 6—6 of Figure 3;
Figure 7 is a section on line 7—7 of Figure 3;
Figure 8 is a side elevation of portion of the driving mechanism;
Figure 9 is a section on line 9—9 of Figure 3;
Figure 10 is a section on line 10—10 of Figure 3;
Figure 11 and 12 are detail elevations of one of the operating parts, showing the same in different positions, respectively;
Figure 13 is a section on line 13—13 of Figure 3;
Figure 14 is a section on line 14—14 of Figure 3;
Figure 15 is an enlarged view of portion of the mechanism shown in Figure 14;
Figure 16 is a longitudinal section through one of the throttle valves incorporated in the locomotive;
Figures 17 and 18 are enlarged side elevations of portions of the mechanism employed and effecting reversal of operation of one of the motors, certain of the parts being shown in different positions in these two figures;
Figure 19 is an end view of this mechanism;
Figure 20 is a vertical section through the control valve employed;
Figure 21 is a section on line 21—21 of Figure 20; and
Figures 22 to 25 inclusive illustrate rather diagrammatically the movable valve member of the control valve, showing this valve member in different positions in the several views.

The invention may be incorporated in locomotives which vary widely in design and details of construction and that form of locomotive indicated diagrammatically in Figure 1 is set forth by way of example only. It comprises the usual tubular boiler section, generally indicated at 10, steam dome 11, smoke stack 12, operator's cab 13, and fuel and water receptacles housed within the rear compartment 15. The weight of the locomotive is transmitted to the rails through four axles 14 and eight wheels 16, the axles being arranged in pairs and the ends of the axles of each pair of axles being surmounted by bearing members which form portions of a single supporting truck, the locomotive having thus two such supporting trucks.

The details of construction of such trucks comprise no portion of the present invention and it need only be said that each of the trucks includes a central bolster, such as indicated in cross section at 17 in Figure 2, this bolster having a central vertically disposed cylindrical aperture 18 to receive a king pin projecting downwardly from the locomotive body and about the axis of which king pin the truck may horizontally revolve in the usual manner. Each bolster likewise comprises a supporting means for one end of a motor frame, the four motors utilized in the present embodiment of the invention being indicated at A, B, C, and D, respectively, each of these motors being carried in part upon a truck axle and in part upon a bolster. I may, of course, utilize six-wheeled trucks instead of four-wheeled trucks and apply three motors to each such truck, or may utilize more than two trucks. For most purposes, however, a locomotive having two trucks and four driving motors will be sufficient.

Prior to describing further the general arrangement of the operating elements of the locomotive, and the means for energizing and controlling the same, one of the motors will be described in detail. I have illustrated four motors of identical construction and prefer that all of the motors employed in connection with any single locomotive be of the same type, although this need not necessarily be true.

In Figures 3 to 15 inclusive, one of the motors is illustrated in considerable detail. Its operating parts are supported upon a casing or frame 20, which frame has also formed as integral portions thereof the high and low pressure cylinders 21 and 22, respectively, the motor being of the cross compound type, as well as bearing members, webs, and other features for strengthening the frame and facilitating mounting of the moving parts of the motor thereon. Laterally spaced cylindrical bearing members, one of which is indicated at 23, are formed integrally with the frame and associated with each such bearing is a bearing cap 24, the bearing 23 and cap 24 together defining a cylindrical bearing encircling the associated axle 14 whereby the principal portion of the weight of the motor and its frame is communicated to a pair of supporting wheels. Each motor has a frame extension 25 which is connected to the bolster 17, previously referred to, by any suitable means as for instance by the coupling 26.

Supported in spaced bearings, one of which is indicated at 27 in Figure 5 and shown to be formed integrally with the frame, is the transversely extending crank shaft 28, bearing caps 29 cooperating with bearings 27 in securing the crank shaft in the position shown while permitting the free rotation thereof. Fixed on crank shaft 28 and intermediate its supporting bearings is a driving pinion 30. Meshing with the teeth of this driving pinion and mounted for free rotation upon axle 14 is a driving gear 31, clutch mechanism positioned intermediate the driving gear and axle 14 being utilized to automatically connect these members when the driving gear is rotated by force applied thereto by the driving pinion 30. The motor is reversible in its operation and the clutch mechanism is so designed as to effect the operative connection of the driving gear 31 to the axle for either direction of rotation of the driving pinion. The means for rotating the driving pinion 30 and controlling its direction of rotation will be hereinafter fully described.

The clutch mechanism by means of which the driving gear is automatically connected to the driven axle 14 when the motor is energized is of simple but rugged type. As will be seen from an inspection of Figures 8 and 13, spaced parallel circular end plates 32 are secured to the ends of gear 31 by bolts 33, these end plates 32 having aligned circular apertures formed therein, coaxial with gear 31, through which apertures axle 14 extends, annular bearing members 34 being interposed between the cylindrical surface of the axle and the inner edges of end plates 32. So long as the clutch mechanism previously referred to remains inoperative gear 31 may freely revolve upon the axle.

As illustrated in Figure 7 the generally cylindrical inner surface of gear 31 is provided with a series of recesses 35, one side wall of each of these recesses comprising a rounded seating surface 35' for a pawl member, the pawl seating surfaces of adjacent recesses facing in opposite directions. A series of pawls 36 have rounded edge surfaces seating against the similarly formed seating surfaces of certain of the recesses and a second series of pawls 37 have cylindrical edge surfaces which seat, respectively, against corresponding formed pawl seating surfaces of alternate recesses, the result being that each pair of adjacent pawls 36 and 37 have their adjacent edges seated upon gear 31 and, in effect, extend in opposite directions from the common intermediate abutment parts 31' of driving gear 31.

Each of the pawls described has a trunnion portion projecting through one of the end plates 32, one of the pawls 37 being illustrated in Figure 13 and being shown to have a cylindrical trunnion 38 projecting through an aperture formed in the left-hand plate 32. Projecting laterally from the outer end of trunnion 38 is an arm 39, extending generally radially inward and having its inner end positioned between spaced lugs 40 (Figure 11) projecting laterally from a friction ring 41, which ring is rotatably supported upon the end of axle bearing sleeve 42. Curved friction shoes 43 rest against the cylindrical outer surface of friction ring 41, these friction shoes having their outer ends pivotally connected, as at 44, to bearing cap 24 and their adjacent ends spaced apart but resiliently drawn together by an adjustable spring tension device. This device comprises a bolt member 45 extending through aligned apertures in the adjacent ends of shoes 43 and having a bolt head 46 at one end and an adjustable nut 47 at the other, or adjustable nuts upon both ends, coiled compression springs 48 being confined between these last mentioned nuts and the ends of shoes 43, respectively. By suitable adjustments of nut 47 the springs may be caused to act upon so as to tend to draw together the inner ends of the friction shoes and by the means just described these shoes may be caused to bear with the desired amount of force upon the associated friction ring and to retard rotation of this ring about the axis of the axle.

The alternate sets of pawls 36 are provided with trunnion-like extensions similar to those with which pawls 37 are provided, but located at the opposite ends thereof and projecting through apertures formed in the companion end plate 32. These trunnion-like extensions have inwardly projecting arms 50 (Figure 8) which are operatively connected to a friction ring 51 formed and mounted exactly as is the friction ring 41 but located, of course, upon the opposite side of gear 31. An exactly similar friction ring retarding device is also provided by means of which the revolving movement of such ring about its support may be retarded as desired.

Inasmuch as both sets of pawls are carried by the driving gear 31 and both are continuously connected by means of the arms described to their respective friction rings, it follows that when the gear 31 is revolved in either direction of rotation both friction rings are carried with it, the possible swinging movements of the pawls being limited in both directions of angular movement as will hereinafter be made more apparent. It also follows that when the gear 31 is revolved in one direction about the axle, one set of pawls will be so acted upon by the friction ring to which it is connected that these pawls will have their free edges swung inwardly toward the axle whereas the pawls of the second set will have their free ends swung outwardly and into the recesses in the driving gear provided for their reception. When the direction of rotation of the gear 31 is reversed the swinging movements of the two sets of pawls are reversed and those pawls which have previously been swung outwardly will then be swung inwardly and the ones previously swung inwardly will be swung outwardly.

The central portion of axle 14 is, as shown in Figure 13, provided with a cylindrical enlargement and keyed upon this enlarged portion is a sleeve 51 provided with equally spaced radially projecting teeth 52 having elongated, substantially radially disposed, oppositely facing surfaces for engagement by the pawls previously referred to, one series 52' of such radial faces comprising abutment surfaces for the free ends of pawls 36 and the second series 52² of such tooth faces comprising abutment surfaces for the free ends of the oppositely facing pawls 37. In Figure 7 pawls 36 are shown to be in operative position, their rounded outer edges being seated against the seating surfaces formed on gear 31 for that purpose and their free inner edges contacting with the faces 52' of three equally spaced teeth 52 of sleeve 51. Pawls 37 have been swung to inoperative positions. If the direction of rotation of gear 31 is reversed pawls 36 will be moved outwardly by the camming action of teeth 52 upon the inner surfaces of the pawls and pawls 37 will be caused to move to position to drive the axle in the same direction as gear 31 is rotating by the associated friction ring.

Should driving pinion 30 be rendered inactive the driving gear 31 will likewise be restrained against rotation and, if the axle 14 and the sleeve 51 continue to rotate, the previously active series of pawls will be moved outwardly to inoperative position and will be held in such position by the associated friction ring so that the axle may continue to freely rotate without dragging with it any of the gearing or engine parts. In other words, the clutch just described comprises means for operatively connecting a motor to the associated axle, regardless of the direction in which the motor is caused to rotate the driving pinion and also comprises means whereby the operative connection between the motor and the axle is broken as soon as the motor is de-energized while the axle continues to rotate.

Upon the opposite ends of crank shaft 28 are fixed the usual members 60, each carrying a counterweight 61 and a crank pin 62. Connecting rods 63 connect pins 62 to cross heads 64 mounted upon suitable cross head guides 64', the ends of which are rigidly attached to the motor frame. Also connected to cross head 64 are piston rods 65 and 66, the former being connected to a piston 67 of relatively small diameter adapted to work in the high pressure cylinder 21, the latter being connected to a piston 68 of relatively large diameter adapted to work in the low pressure cylinder 22.

Associated with each cylinder is a valve for controlling the flow of steam into and out of the same, the high pressure valve being indicated at 69 and the low pressure valve at 70, both being of conventional shape but differing in diameter. Valve 69 is slidably mounted in valve cage 71, which cage is supported by the frame and has the usual ports for the passage of steam formed therein. A conduit for steam under high pressure is indicated at 72, this conduit extending downwardly and opening at its lower end into a passage which encircles the ported valve cage 71.

By appropriate movements of the valve 69 longitudinally of the cage in a well understood manner high pressure steam is allowed to flow to opposite sides of the piston 67 alternately to bring about the working strokes thereof and expanded steam permitted to flow from the opposite ends of the cylinder alternately through ducts 75 and 76 to the receiver 77, from which receiver it passes under the control of the valve 70 into the low pressure cylinder 22 to effect movements of piston 68 and, after being expanded in this low pressure cylinder for the second time, is allowed to escape through exhaust passage 78.

For the purpose of permitting a small quantity of steam to flow directly into the receiver and thence to the low pressure cylinder when steam is initially turned on, as well as to the high pressure cylinder, a special automatically closing by-pass means is provided. This by-pass device is illustrated in Figures 14 and 15. It comprises essentially a valve and valve operating means of such character that the valve is normally open when steam is not being supplied to the motor and which permits a certain quantity of high pressure steam to pass into the receiver and thence to the low pressure cylinder as soon as the steam is turned on, this valve automatically closing after a pre-determined pressure of steam has been built up on the low pressure side, and thereafter remaining closed until the steam supply is cut off from the motor, whereupon it again automatically opens.

The body of the valve is indicated at 80 and is seen to comprise a generally cylindrical member the lower end of which has threaded engagement with the upper end of a cap 81 having a tubular extension 82 which projects through the bottom wall of the receiver and is encircled by suitable packing material 83 to prevent steam linkage. Spindle-like projection 82 is centrally apertured, the central passage 84 being continuous and bringing the interior of the valve body into communication with the atmosphere. Intermediate its ends the valve body 80 is provided with a restricting portion 85 defining an axial open ended cylinder within which the plunger 86 slidably fits. Plunger 86 has on its lower end a spring seat 87 against which the upper end of a coiled compression spring 88 bears, the lower end of this spring being seated on the cap 81. The upper end of the plunger comprises an upwardly tapering projection 89' having a flattened upper end surface of reduced area which surface is adapted to engage the ball valve 89 and to elevate the same from its seated position, as shown in full lines (Figure 15) to its unseated position, as shown in dotted lines, when the plunger is moved under the action of spring 88 to its uppermost position. Ball valve 89 is adapted to seat on an annular valve seat member 90 secured within the upper end of the valve body 80 and is at all times retained within a generally spherical chamber formed in a cap 91 which is secured by bolts to the upper surface of the motor frame. Ribs 92 integral with cap 91 project inwardly and comprise means for guiding the ball valve 89 in its vertical movements.

By means of a duct 93 formed in cap 91 and a communicating duct 94 formed in the main frame and in communication with the steam inlet passage, steam may pass into the valve chamber and, if the valve is at this time elevated, may pass downwardly through the central aperture in the valve seating member 90 and thence outwardly through ports 95 formed in the wall of the valve body, and into the receiver.

As has previously been explained valve 89 occupies its uppermost or dotted line position whenever the motor is not in operation. Assuming high pressure steam to be turned on, for instance, steam which may have a pressure as much as 600 pounds per square inch, a portion of this steam will immediately find its way through ducts 94 and 93, under the raised valve, and will thence escape through ports 95 into the receiver. The pressure in the receiver almost immediately begins to build up and, as it builds up, increasing pressure is exerted upon the upper end of plunger 86 and this plunger commences to move downwardly, its downward movement being opposed only by atmospheric pressure and by the action of spring 88. Just as soon as the pressure within the receiver exceeds a certain minimum, which is determined by the strength of spring 88, say a pressure of 170 pounds per square inch, the plunger 86 will move downwardly to such extent that the ball valve 89 will be seated upon the seating ring 90. As soon as this happens the pressure of steam on the high pressure side of the seating ring 90 increases rapidly, for instance up to a pressure of 600 pounds per square inch and, as will be obvious, the ball valve 89 will be maintained tightly seated due to this superior pressure until the steam supply to the motor is cut off. It is desirable in a device of this nature employing a ball valve to have the diameter across the outer periphery of the cylindrical ball seating surface approximately equal to the diameter of the plunger 86, so that the ball valve does not retard or obstruct upward movement of the piston when the steam pressure above the valve is the same as that in the receiver, as it would were the ball valve of larger diameter.

Each of the steam exhaust passages 78 leading from the low pressure cylinder of the motor is brought into communication, by means of a suitable branch pipe, with the main steam exhaust pipe F, shown in Figure 1, this pipe extending forwardly of the boiler and discharging upwardly toward the smoke stack 12 in the usual manner.

The valve operating mechanism is disclosed in Figures 3, 5, 9, 10, 17, 18, and 19. Each valve mechanism includes the customary valve stem, slidably supported in the usual way, the high pressure valve stem being indicated at 100 and the low pressure stem at 101. The end of the high pressure valve stem 100 is connected by means of a link 102 to the lower end of a rocker 103 rotatably supported at its mid-point upon an arbor 104 projecting laterally from bearing cap 29. The upper end of rocker 103 is connected by means of the curved eccentric rod 105 to a pin 106 upon an eccentric crank 107 rigidly secured upon the outer end of an eccentric crank shaft 108. Eccentric shaft 108 is supported in bearings formed in the upper ends of pedestals 108' which comprise bracket-like extensions of main crank shaft bearings 29.

As shown in Figure 9 there is fixed upon the opposite end of eccentric crank shaft 108 a second crank arm 109, disposed at an angle of approximately 90° to the eccentric crank 107. The outer end of crank 109 is connected by eccentric rod 110, rocker 111, and link 112, to the end of the low pressure valve stem 101. From this it follows that rotation of shaft 108 results in simultaneous sliding movements of the two valves, the valves being, however, in different phase, as is usual. Eccentric crank shaft 108 is driven from the driving pinion 30 through a spur gear 113, in constant mesh with gear 30, and through an adjusting mechanism now to be described.

From an inspection of Figure 10 it will be perceived that gear 113 is rigidly mounted upon a sleeve 114 which is in turn freely rotatable upon shaft 108, ball bearings being preferably interposed between the sleeve and shaft. The inner end of sleeve 114 is enlarged and toothed so that this portion comprises a bevel gear which is indicated at 115. A similarly formed but oppositely facing bevel gear 116 is keyed to shaft 108, as shown in Figure 10, and operatively connecting gears 115 and 116 is a third gear 117 which is rotatably mounted upon a trunnion member 118 disposed radially with respect to shaft 108 and the inner end of which is rigidly secured to and preferably formed integrally with a sleeve 119 mounted upon shaft 108 intermediate gears 115 and 116, roller bearings being preferably interposed between sleeve and shaft so that free relative rotation is facilitated.

Provided that trunnion 118 is adequately supported it follows that rotation of gear 115 will be communicated to gear 116 through gear 117, gears 115 and 116 rotating at equal angular velocities but in opposite directions so that shaft 108 is rotated in a direction opposite to that in which gear 113 rotates but in the same direction as that in which the driving pinion 30 rotates. In the operation of the device, the trunnion 118 will occupy and be definitely supported in either one or the other of two positions, in one of which positions the valves are so timed with respect to each other in their movements that the motor will drive the associated axle in one direction, and in the other of which position the relationship of the valves is so changed that the operation of the motor will be reversed. Thus, by referring to Figures 17 and 18 the two positions of the trunnion, and hence of gear 117, for forward and reverse motion of the motor are illustrated.

To conveniently move gear 117 from one position to another, an air pressure operated device is employed comprising essentially a cylinder 120 one end of which is pivotally connected as at 121 to a bracket-like projection 122 extending upwardly from one of the main frame axle bearing caps, as may be seen upon inspecting Figure 9. Within this cylinder is a piston 123 having a piston rod 124 projecting through the end wall thereof, the outer end of this piston rod being pivotally connected to a lever 125 mounted upon a transversely extending shaft 126 supported in spaced bearings 127 which are secured to the main crank shaft bearing caps, shaft 126 being hereinafter designated the reverse shaft. Also fixed on shaft 126 is an arm 128 the upper end of which is connected by means of a link 129 to a lateral extension of the sleeve 119 upon which the trunnion 118 is fixed.

Suitable ports are formed in the wall of cylinder 120, at the opposite ends thereof, and fluid supply lines are provided for bringing fluid, such as air, under pressure, from a distant source to either end of the cylinder and permitting fluid on the opposite side of the piston to escape from the cylinder, thus making it possible to reciprocate the piston as desired and to maintain the piston at either end of its stroke by fluid pressure. Due to a slight rocking movement of cylinder 120 in effecting reversal of the mechanism just described, the air lines 169 and 170 are made flexible. They pass through suitably formed apertures in the cover 132 of the motor and to a distant control means, as will be hereinafter described.

In Figures 17 and 18, showing the gear 117 in both of its extreme positions of adjustment, the relative positions of the eccentric crank arms 109 and 107 are illustrated and it will be perceived that in the movement of gear 117 from the position in which it is illustrated in Figure 17 to that shown in Figure 18, the crank arm 109 has been moved approximately 100° in a clockwise direction, the crank arm 107 having been moved through the same angle and in the same direction. The shifting of the angular positions of the eccentric crank arms effects the shifting of the relative positions of the valves to effect reversal of the motor and by means of the reversing cylinder and mechanism just described such reversal may be accomplished with great ease.

It is of course apparent that as the sleeve 119 and trunnion 118, together with gear 117, are moved about the axis of the eccentric shaft by the means and in the manner just described, the change in angular positions of the eccentric arms 107 and 109 results from rotation of the eccentric shaft 108. The gear 115 remains stationary during reversal, being locked in position by gear 113, which is in turn prevented from revolving because meshing with the driving pinion, which pinion is anchored to the pinions and heavy interconnecting parts. Hence the gear 117 rolls on gear 115 as the angularity of trunnion 118 is changed and gear 116 and shaft 108 are caused to revolve through angles twice as great as that through which the trunnion 118 moves in passing from one extreme position to the other. The mechanism is so designed that the axis of trunnion 118 moves through an angle of approximately 50° in effecting reversal and hence shaft 108 and the eccentric crank arms on the ends thereof are caused to revolve through angles of approximately 100°. For limiting the angular movements of the reverse shaft 126 positive stop means is provided, including a stop lug 126' fixed upon the shaft 126 and preferably integral therewith and abutment members 29' supported upon bearing cap 29. The abutment members 29' are formed as threaded bolts provided with lock nuts in order that the permissible rotatory movement of the reverse shaft may be nicely regulated. While reversal of the direction of operation of the motor is effected in changing the positions of the valves by the mechanism just described, no change in "cut-off" is effected and the valves are so positioned in each instance with respect to the steam ports as to provide for maximum expansion of the steam entering the cylinders.

From the foregoing description it is clear that each of the motors A, B, C, and D is one in which such steam as is supplied thereto is utilized in the most efficient manner at all times; that no complicated heavy and expansible entrainment mechanism is provided for operatively connecting the engine to the driven axle and disconnecting it therefrom, a simple but durable clutch mechanism automatically accomplishing this driving connection for either direction of rotation of the motor and automatically releasing the driven axle from the driving parts when the motor is de-energized at a time when the locomotive is in motion; and which embodies a very simple type of reversing mechanism operable by remote control from the locomotive cab. The entire motor and frame occupies but small space and may be very conveniently placed upon a truck of no great height or length.

Referring now to Figures 1, 14, and 20 to 25, inclusive. Connected to the upper surface of each of the motor frames and so as to discharge steam into the steam inlet passage 72 thereof is the discharge end of a high pressure steam line 140. These several steam lines are extended upwardly, as diagrammatically indicated in Figure 1, and communicate at their upper ends with the main steam line 141 extending longitudinally of the locomotive body. The branch steam lines 140 contain suitable flexible portions or joints to permit free swiveling action of the trucks beneath the locomotive body without interrupting the steam flow. Interposed in each of these branch steam lines 140, save only the one which leads to the forward motor A, are throttles, which may be designated secondary throttles and which are indicated at B', C', and D', respectively. One of these secondary throttles is illustrated in section in Figure 16. No novelty is claimed with respect to the details of construction of these throttles and it need only be explained here that each comprises essentially a valve casing 142 having a steam inlet port 143, steam outlet port 144, valve seat 145, valve 146, valve operating crank lever 147, and mechanism for operating this lever which includes cylinder 148 having an air inlet port 149 and piston 150 movable in one direction by air pressure and in the opposite direction by a spring 151.

The air inlet ports of the several air cylinders 148 may be connected at the will of the operator to a suitable source of supply of air under pressure (not illustrated), the air line from the source of supply being indicated at 152. This air supply line 152 leads to a valve generally indicated at 153 in Figure 1 and from this valve air supply lines 154, 155, and 156 lead to the several secondary throttles. By manipulating the operating handle 157 of the valve the engine man may cause secondary throttles B', C', and D' to be successively opened or, by moving the operating lever to a neutral position, shut off the supply of compressed air to the secondary throttle operating cylinders and simultaneously vent these cylinders to the atmosphere so that the throttles are quickly closed. The main steam line 141 is connected to the superheater header 157 by steam line 158, controlled by a primary throttle 159. Opening and closing movements of the primary throttle valve may be effected manually by the engine man, this valve being connected by link 160 to a throttle lever 161 of usual type located in the cab. The forward motor A will of course be immediately energized when the primary throttle 159 is opened while the second, third, and fourth motors B, C, and D may only be energized by opening of the secondary throttles B', C', and D', as heretofore explained. Operation of the several valve motion reversing cylinders 120 is also controlled by valve 153.

Upon again referring to Figure 1 it will be perceived that the compressed air line 165 leading forwardly from valve 153 is brought into communication with one end of each cylinder 120 by suitable connecting pipes, a rearwardly extending air line 166 which communicates at its forward end with air line 165 leading directly to the reversing cylinder 120 of the forward motor A, having branches 167, 168, and 169 leading to the reversing cylinders associated with motors B, C, and D, respectively.

The opposite ends of these several reversing cylinders are connected respectively by branch lines 170, 171, 172, and 173 to a longitudinally extending main 174 which in turn extends to the valves 153. The valve is so constructed that, when operating handle 157 is moved in one direction, air under pressure is permitted to flow to air main 165, and thence to the corresponding ends of each of the reversing cylinders and at the same time the opposite ends of these cylinders are brought into communication with the atmosphere through main 174, that is, are vented at the valve 153 through this main, so that the movements of the pistons are unopposed by air under more than atmospheric pressure. When the valve 157 is moved in the opposite direction, the several reversing pistons will be moved in the opposite directions simultaneously and hence it is clear that by the mechanism described all four of the motors may be reversed at the will of the operator simultaneously. The valve 153 may be constructed in various ways but in any event will be so devised that the motors will be reversed simultaneously.

A preferred form of control valve 153 is illustrated in Figures 20 to 25. This valve contains a single valve member which not only controls the reversing of the several motors by the means just described but also controls the opening and closing movements of the secondary throttles B', C', and D'. By means of a single lever the engineman may effect the reversal of the motors and control the steam flow thereto.

The valve comprises essentially a base or seating member 180 to which is secured the hollow housing 181, this housing having a generally cylindrical interior, as shown in Figures 20 and 21. The valve member proper is indicated at 182 and comprises a cylindrical ported plug which seats against the inner face of the base or valve seating member 180 and is adapted to be rotated about its central axis. For the purpose of rotating the valve member 182 the handle 157 is provided, the lower end of this handle being fixed upon the outer end of a cylindrical arbor 183 which extends through a cylindrical aperture formed in the housing 181 coaxially with the cylindrical cavity within the housing. Arbor 183 is enlarged at its inner end, having a collar portion 184 and an air sealing ring 185 is interposed between the adjacent faces of the housing and collar to prevent air leakage. This arbor has also an inwardly extending squared projection 186, parallel outer surfaces of which lie between and slidingly engage the mutually facing parallel surfaces of lugs 187 formed integrally with the movable valve member 182. The squared extension 186 is centrally apertured at 188 and a compression spring 189 within this aperture has its outer end contacting with the valve member 182 to normally press this valve against the seating member 180. It follows from this that the valve member 182 may be revolved at will by the operator who manipulates operating handle 157. A spring pressed latch 190 may be engaged with any one of a number of notches formed in series as a segment upon the upper side of the valve housing in order that the operating handle and valve may be located in any desired position of adjustment.

The air supply pipe 152, previously described as conducting air from a suitable source of supply to the valve, conducts air under pressure at all times into the interior of the housing 181 on the right-hand side of the valve member 182, as shown in Figure 20. The valve seating member 180 has five ports for the discharge of air under pressure extending therethrough to the outer end of each of which the air lines for supplying air to the secondary throttles and to the reversing cylinders are connected. It also has a central port 191 for discharging air directly to the atmosphere. The comparatively small elongated ports 192, 193, and 194 formed in the valve seating member 180 communicate, respectively, with the air lines 154, 155, and 156 by means of which air under pressure is communicated to the several secondary throttle operating cylinders. The circular ports 195 and 196 are in communication, respectively, with the air conducting mains 165 and 174. The cylindrical valve member 182 is provided with three feed ports 197, 198, and 199 which entend completely therethrough, and with an enlarged T-shaped recess 200 formed in that side of the valve which lies next adjacent the seating member 180. This recess 200 is therefore in constant communication with the air discharge vent 191 but is never in direct communication with the source of supply of air under pressure. In Figure 21 nine possible positions of the valve operating lever are indicated, this member, as shown in chain lines, occupying a central position H and being movable to the right to successively occupy positions K, L, M, and N, or movable to the left to successively occupy positions O, P, R, and S, the rotating valve 182 of course following the valve operating member in its rotatory movements.

With the valve positioned as shown in Figure 21 both ports leading to the motor reversing air lines are shown to be closed while the ports 192, 193, and 194 leading to the secondary throttles, respectively, are in communication with the recess 200 and hence these throttle lines are simply vented to the atmosphere through port 191. If the handle 157 is moved to position K the valve 182 will occupy the position in which it is shown in Figure 22, the air feeding aperture 197 being brought into partial register with port 195 and port 196 being brought into partial register with the exhaust air venting recess 200. In this position air is supplied under pressure to the air main 165 and to all of the reversing cylinders 120 and to that side of the piston within each cylinder upon which it is necessary to exert pressure to effect movement of the piston for adjustment of the motor for movement in a forward direction. Any air which may have been confined on the opposite side of the piston is vented to the atmosphere through port 196 and aperture 191. In this position of the valve the motors are all adjusted for forward movement but no steam has as yet been allowed to flow to the motors for the purpose of energizing the same. When the lever 157 is moved further toward the right (Figure 21) or to position L, the valve occupies the position in which it is shown in Figure 23, the feed port 197 remaining in register with port 195 and the exhaust cavity 200 remaining in register with port 196. The air feed 198 has, however, been brought into register with port 192 allowing air under pressure to flow to the valve lifting cylinder of the secondary throttle B' and thus causing the associated steam valve to open. A further movement of the valve to position M has the effect of bringing port 193 into register with feed port 198 so that both secondary throttles B' and C' are open and a final movement of the valve to position N effects opening of all three secondary throttles, the feed port 198 being then in full communication with the three ports 192, 193, and 194, as shown in Figure 25.

Notwithstanding movements of the valve lever 157 no steam will flow to any of the motors and it is necessary for the engineer to operate the main throttle lever 161 to open throttle 159 before the motors will be energized. Throttle 159 may be opened, of course, prior to the opening of any of the supplemental throttles so that the several motors are successively brought into operation as the supplemental throttles are opened instead of being simultaneously energized as in the case where the supplemental throttles are first opened and then the main throttle 159.

The valve 182 is symmetrically formed and the valve ports formed in the block 180 are symmetrically arranged and as a result movement of the handle 157 successively to positions O, P, R, and S effects first, reversal of the motors, and thereafter energization of motors B, C, and D, these motors, however, operating in reverse direction. In this movement of the handle 157 toward the left, the motors B, C, and D are successively cut in in exactly the same manner in which they were successively cut in by movement of the handle toward the right, the feed port 199, however, being brought into successive register with ports 194, 193, and 192.

While the valve illustrated comprises a particularly convenient means for controlling the compressed air used in the manipulation of the secondary throttles and the reversing mechanism, other valve means may be employed without departure from the invention. Likewise other details of the motors and control mechanism may be considerably varied in adapting the principles of the invention to locomotives of different types, as will be clear to one skilled in the art.

Having thus described the invention, what is claimed as new and desired to be secured by Letters Patent is:

1. A locomotive in which all of the driving axles may be connected to or disconnected from the engine means, and in which each driving axle is rotatable independently of the others, comprising, in combination, a plurality of independently rotatable driving axles, a plurality of motors each capable of developing substantially the same tractive effort as any other one of said motors, when energized, one motor being associated with each axle and adapted to drive the same, the crank shaft of each motor being non-resiliently supported upon the axle with which the motor is associated, each motor being of the fixed cut-off type and developing the same tractive effort, when energized, at all speeds of the locomotive, and said motors collectively developing the entire tractive effort of the locomotive, means for connecting each motor to the associated axle for forward or reverse rotation of the axle or for disconnecting the motor and axle to permit free rotation of the axle when the associated motor is inoperative, a boiler the maximum capacity of which may be utilized by any one, or all, of the motors, and means for supplying steam from the boiler to one, or a plurality, or all of said motors as desired.

2. A locomotive in which all of the driving axles may be connected to or disconnected from the engine means, and in which each driving axle is rotatable independently of the others, comprising, in combination, a plurality of independently rotatable driving axles, a plurality of motors each capable of developing substantially the same tractive effort as any other one of said motors, when energized, one motor being associated with each axle and adapted to drive the same, the crank shaft of each motor being non-resiliently supported upon the axle with which the motor is associated, each motor being of the fixed cut-off type and developing the same tractive effort, when energized, at all speeds of the locomotive, and said motors collectively developing the entire tractive effort of the locomotive, means for connecting each motor to the associated axle for forward or reverse rotation of the axle or for disconnecting the motor and axle to permit free rotation of the axle when the associated motor is inoperative, a boiler the maximum capacity of which may be utilized by any one, or all, of the motors, and means for supplying steam from the boiler to one, or a plurality, or all of said motors as desired, said last mentioned means including a main steam line, branch steam lines leading, respectively, from the main steam line to the motors, a throttle in the main steam line, and auxiliary throttles in the branch steam lines, respectively, with the exception of one such branch line, whereby at least one of said motors is supplied with steam whenever the main throttle is open.

3. A locomotive in which all of the driving axles may be connected to or disconnected from the engine means, and in which each driving axle is rotatable independently of the others, comprising, in combination, a plurality of independently rotatable driving axles, a plurality of reversible motors each capable of developing substantially the same tractive effort as any other one of said motors, when energized, one motor being associated with each axle and adapted to drive the same, the crank shaft of each motor being non-resiliently supported upon the axle with which the motor is associated, each motor being of the fixed cut-off type and developing the same tractive effort, when energized, at all speeds of the locomotive, and said motors collectively developing the entire tractive effort of the locomotive, means for connecting each motor to the associated axle for forward or reverse rotation of the axle or for disconnecting the motor and axle to permit free rotation of the axle when the associated motor is inoperative, means for reversing the motors, a boiler the maximum capacity of which may be utilized by any one, or all, of the motors, and means for supplying steam from the boiler to one, or a plurality, or all, of said motors as desired.

4. A locomotive in which all of the driving axles may be connected to or disconnected from the engine means, and in which each driving axle is rotatable independently of the others, comprising, in combination, a plurality of independently rotatable driving axles, a plurality of reversible motors each capable of developing substantially the same tractive effort as any other one of said motors, when energized, one motor being associated with each axle and adapted to drive the same, the crank shaft of each motor being non-resiliently supported upon the axle with which the motor is associated, each motor being of the fixed cut-off type and developing the same tractive effort, when energized, at all speeds of the locomotive, and said motors collectively developing the entire tractive effort of the locomotive, means for connecting each motor to the associated axle for forward or reverse rotation of the axle or for disconnecting the motor and axle to permit free rotation of the axle when the associated motor is inoperative, a manually operable control member, mechanism for effecting simultaneous reversal of all of said motors when said member is actuated, a boiler the maximum capacity of which may be utilized by any one, or all, of the motors, and means for supplying steam from the boiler to one, or a plurality, or all, of said motors as desired.

5. A locomotive in which all of the driving axles may be connected to or disconnected from the engine means, and in which each driving axle is rotatable independently of the others, comprising, in combination, a plurality of independently rotatable driving axles, a plurality of reversible motors each capable of developing substantially the same tractive effort as any other one of said motors, when energized, one motor being associated with each axle and adapted to drive the same, the crank shaft of each motor being non-resiliently supported upon the axle with which the motor is associated, each motor being of the fixed cut-off type and developing the same tractive effort, when energized, at all speeds of the locomotive, and said motors collectively developing the entire tractive effort of the locomotive, a clutch interposed between each motor crank shaft and the associated axle, said clutch automatically operating to connect the crank shaft and axle when the motor is operated in either direction but permitting free rotation of the axle relatively to the crank shaft when the motor is deenergized, means for reversing the motors, a boiler the maximum capacity of which may be utilized by any one, or all, of the motors, and means for supplying steam from the boiler to one, or a plurality, or all, of said motors as desired.

6. A locomotive in which all of the driving axles may be connected to or disconnected from the engine means, and in which each driving axle is rotatable independently of the others, comprising, in combination, a plurality of independently rotatable driving axles, a plurality of motors, each capable of developing substantially the same tractive effort as any other one of said motors, when energized, one motor being associated with each axle and adapted to drive the same, the crank shaft of each motor being non-resiliently supported upon the axle with which the motor is associated, each motor being of the fixed cut-off type and developing the same tractive effort, when energized, at all speeds of the locomotive, and said motors collectively developing the entire tractive effort of the locomotive, a clutch interposed between each motor crank shaft and the associated axle, said clutch automatically operating to connect the crank shaft and axle when the motor is operated but permitting free rotation of the axle relatively to the crank shaft when the motor is deenergized, a boiler the maximum capacity of which may be utilized by any one, or all, of said motors, and means for supplying steam from the boiler to one, or a plurality, or all, of said motors as desired.

JOHN A. McGREW.